(12) United States Patent
Kim et al.

(10) Patent No.: US 6,503,968 B1
(45) Date of Patent: Jan. 7, 2003

(54) ASPHALT MODIFIER OF STYRENE-BUTADIENE-STYRENE BLOCK COPOLYMER AND STYRENE-BUTADIENE LATEX

(75) Inventors: Young Sang Kim, Ulsan (KR); Dong Gook Park, Ulsan (KR); Kyo Dong Jo, Ulsan (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/654,846

(22) Filed: Sep. 5, 2000

(30) Foreign Application Priority Data

Nov. 10, 1999 (KR) .............................. 99-49686

(51) Int. Cl.$^7$ ................................. C08K 3/00
(52) U.S. Cl. .............................. 524/1; 524/60; 524/515; 524/526; 524/801; 524/804; 524/836
(58) Field of Search ................. 524/501, 505, 524/515, 526, 801, 804, 836, 60

(56) References Cited

U.S. PATENT DOCUMENTS 5,151,456 A * 9/1992 Elias et al. .................. 524/60

* cited by examiner

*Primary Examiner*—Edward J. Cain
(74) *Attorney, Agent, or Firm*—Davidson, Davidson & Kappel, LLC

(57) ABSTRACT

This invention relates to an asphalt modifier comprising 5~30 wt. %. of solubilized styrene-butadiene-styrene block copolymer and 70~95 wt. % of solubilized styrene-butadiene latex, which has an excellent resistance property against plastic deformation, while preventing the occurrence of crack at a low temperature.

1 Claim, No Drawings

ASPHALT MODIFIER OF STYRENE-BUTADIENE-STYRENE BLOCK COPOLYMER AND STYRENE-BUTADIENE LATEX

FIELD OF THE INVENTION

This invention relates to an asphalt modifier comprising an emulsion of styrene-butadiene-styrene block copolymer and a styrene-butadiene latex and more particularly, to the asphalt modifier which has an excellent resistance property against plastic deformation, while preventing the occurrence of crack at low temperature.

DESCRIPTION OF THE RELATED ART

Ascone, which has been widely used as a road-paving material, is a mixture of both asphalt cement and aggregate. Since it is prepared by heating the mixture, ascone is called as "hot mix asphalt" or "asphalt binder" due to the fact that an asphalt cement is combined to aggregate.

Since the roads paved by the asphalt have suffered from frequent ruptures, plastic deformations and detachments under various adverse conditions such as passing of heavy vehicles, weather and traffic environments, the life of roads is getting shorter. Especially, the plastic deformation is the most serious problem that the asphalt-paved roads have encountered. That is, the roads encountered frequently with heavy vehicles will lose their intrinsic functions due to the occurrence of plastic deformation during summer season. Moreover, the outer temperature condition, heavy traffic, and the recent trends toward more heavy and large vehicles make the serious plastic deformation worse.

Under such circumstances, there is urgent need for the development of novel high-quality paving materials and thus the inventor et al. intended to improve the resistance against plastic deformation using the emulsion of styrene-butadiene-styrene block copolymer as asphalt modifier.

However, a single use of the emulsified styrene-butadiene-styrene block copolymer as asphalt modifier was found to effectively prevent the plastic deformation, but the occurrence of crack at low temperature was inevitable due to its resin properties (hardness).

SUMMARY OF THE INVENTION

To free from the above shortcomings, the inventor et al. have made intensive studies and noted that the use of both the emulsion of styrene-butadiene-styrene block copolymer and styrene-butadiene latex as asphalt modifier can ensure an excellent resistance property against plastic deformation, while preventing the occurrence of crack at low temperature.

Therefore, an object of this invention is to provide an asphalt modifier which has an excellent resistance property against plastic deformation, while preventing the occurrence of crack at low temperature.

DETAILED DESCRIPTION OF THE INVENTION

To achieve the above objective, this invention is characterized by an asphalt modifier comprising 5~30 wt. % of emulsified styrene-butadiene -styrene block copolymer and 7~95 wt. % of styrene-butadiene latex.

This invention is explained in more detail as set forth hereunder.

In general, the styrene-butadiene-styrene block copolymer generates a lot of cracks at low temperature due to its resin properties. Furthermore, a sigle use of the block copolymer as asphalt modifier will make the production cost high.

Since the elongation property of a styrene-butadiene latex is high at low temperature, its mixture with the emulsion of styrene-butadiene-styrene block copolymer can ensure the prevention of crack at low temperature, while curtailing the production cost with the addition of styrene-butadiene latex in a larger amount.

If the content of the styrene-butadiene latex exceeds 95 wt. % to the total chemical composition of asphalt modifier, the plastic deformation cannot be prevented. On the other hand, if its content is less than 70 wt. %, the inhibitory action against the occurrence of crack at low temperature is minimal with little economical effect. Therefore, it is preferred that 70~95 wt. % of the styrene-butadiene latex should be added to the total chemical composition of asphalt modifier.

The asphalt modifier of this invention can be selected from the emulsion of styrene-butadiene-styrene block copolymer prepared by the conventional method.

The inventor et al. proposed a method of emulsified the styrene-butadiene-styrene block copolymer, wherein it comprises the following steps of:

solubilizing the styrene-butadiene-styrene block copolymer in a nonpolar solvent to make a solution with the concentration of 10~15%;

emulsifying 100 wt. parts of the solution in 5~10 wt. parts of a co-emulsifier and water; and preparing an emulsion with a certain amount of solid content after the nonpolar solvent is removed using a vacuum equipment and concentrated.

The emulsified styrene-butadiene-styrene block copolymer is mixed with styrene-butadiene latex in order to prepare an asphalt modifier of this invention. The asphalt modifier comprising 5~30 wt. % of emulsified styrene-butadiene-styrene block copolymer and 70~95 wt. % of styrene-butadiene latex.

As proposed earlier, the styrene-butadiene latex is prepared comprising the steps of:

a synthesis of seed particle conducted 4° C. for 3 hours using 10~30 wt. parts of butadiene monomer, 3~10 wt. parts of butylacrylate monomer, 3~10 wt. parts of styrene monomer, 0.1~1.0 wt. parts of SLS/0.1~1.5 wt. parts of rosin salt/0.1~1.5 wt. parts of fatty salt as emulsifer, 0.1~1.0 wt. parts of phosphate as electrolyte, 0.2~1.0 wt. parts of tertiary dodecyl mercaptane as molecular weight modulator, 0.1~1.0 wt. parts of diisopropylbenzene hydroperoxide as oxidant and 0~0.5 wt. parts of tetrasodium ethylene diamine tetraacetate hydride as catalyst; and;

an additional polymerization to enlarge the seed particle conducted using 40~60 wt. parts of butadiene monomer, 3~13 wt. parts of metylmethaacrylate, 5~25 wt. parts of styrene monomer, 0.1–2.0 wt. parts of rosin salt as emulsifer, 0.2~1.0 wt. parts of tertiary dodecyl mercaptane as molecular weight modulator and then, the mixture was reacted for 5 hours by increasing the temperature up to 12° C., reacted additionally at 20° C. for 5 hours. The temperature was raised at 25° C. for the further activation before the termination of the reaction,.

This invention is explained based on the following examples but is not limited by these examples.

MANUFACTURING EXAMPLE 1

Emulsification of Styrene-butadiene-styrene Block Copolymer

The method of emulsified the styrene-butadiene-styrene block copolymer according to the invention is prepared as proposed earlier as follows:

The styrene-butadiene-styrene block copolymer according to this invention is prepared by ourselves; its form includes pellet or powder with the following parameters: styrene content (31%), solution viscosity (15,000 cps), specific gravity (0.94 g/cm$^3$), tensile strength 160 kgf/cm$^2$, 300% tensile stress (28 kgf/cm$^2$) and elongation rate (680%).

First, the styrene-butadiene-styrene block copolymer was dissolved in n-hexane to make its concentration 10~15%.

Then, 100 wt. parts of the styrene-butadiene-styrene block copolymer solution dissolved in n-hexane were emulsified in the mixture of 5~10 wt. parts of a co-emulsifier and 80~100 wt. parts of water. According to this invention. A mixture of rosin salt, fatty salt and oleate was employed as a co-emulsifier.

The styrene-butadiene-styrene block copolymer in n-hexane, which was emulsified by the co-emulsifier, was concentrated to obtain the emulsion of styrene-butadiene-styrene block copolymer. The general description was shown in the following table 1.

TABLE 1

| Content of solid material | 50.5 |
|---|---|
| pH (25° C.) | 10.5 |
| Particle size (Å) | 1.230 |
| Viscosity (cps) | 350 |

MANUFACTURING EXAMPLE 2

Preparation of Styrene-butadiene Latex

To form the initial seed particle during the initial polymerization, all reagents, which were shown in the following table 2 were added to a 2L high-pressure reactor except for diisopropylbenzene hydroperoxide as oxidant and stirred at 3° C. for 1 hour. With the addition of diisopropylbenzene hydroperoxide, the polymerization was initiated by increasing the temperature up to 5° C.

When the conversion rate of initial monomers reached more than 80% and the initial particle size was grown up to 300 Å the monomers for the increament were added continuously for the enlargement of particle size and further reaction.

1.0 wt. parts of rosin salt as an emulsifier was added after 3 hours from the addition of diisopropylbenzene hydroperoxide as an oxidant at an initial reaction step, and thereafter 1.5 wt. parts of rosin salt were added after 8 hours.

The polymerization temperature was initiated at 5° C. and then, the temperature was increased from 5° C. to 12° C. after 3 hours. The initial reaction would be completed during that 3 hours. The temperature was also increased up to 20° C. after 12-hour reaction and then, the reaction was further activated by increasing the temperature 25 ° C. after 4-hour reaction and terminated.

TABLE 2

| Polymerization step | Composition | Content (wt. part) |
|---|---|---|
| Initial | Butadiene monomer | 14 |
| | Butylacrylate monomer | 3 |
| | Styrene monomer | 7 |
| | Sodium lauryl sulfate | 1.0 |
| | Rosin salt | 0.4 |
| | Fatty salt | 0.5 |

TABLE 2-continued

| Polymerization step | Composition | Content (wt. part) |
|---|---|---|
| | Phosphate | 0.3 |
| | Tertiary dodesyl mercaptane | 1.0 |
| | Diisopropylbenzene hydroperoxide | 0.58 |
| | Tetrasodium ethylene diamine tetraacetate | 0.2 |
| | Ionized water | 80.1 |
| Enlargement | Butadiene monomer | 55 |
| | Methylmethacrylate monomer | 6 |
| | Styrene monomer | 15 |
| | Tertiary dodesyl mercaptane | 1.0 |
| | Rosin salt | 2.5 |

The general description of the obtained styrene-butadiene latex from the given recipe was shown in the following table 3.

TABLE 3

| Content of solid material | 50.1 |
|---|---|
| pH (25° C.) | 10.0 |
| Particle size (Å) | 1.340 |
| Viscosity (cps) | 370 |

EXAMPLES 1~3

The asphalt modifier was prepared using each of emulsified styrene-butadiene-styrene block copolymer and styrene-butadiene latex. Table 4 was shown the mixture ratio of the given components

TABLE 4

(Unit: wt. %)

| | Emulsified styrene-butadine-styrene block copolymer | Styrene-butadine latex |
|---|---|---|
| Example 1 | 5 | 95 |
| Example 2 | 13 | 87 |
| Example 2 | 30 | 70 |
| Com. example 1 | 100 | — |

Experimental Example 1

To measure the occurrence of plastic deformation of asphalt, the wheel tracking tests were performed on the modified ascone using each of asphalt modifiers prepared from Examples 1~3 and Comparative example 1. The test results were shown in the following table 6.

The samples for the wheel tracking tests were prepared as shown in table 5. There were the ratios of aggregate size for the manufacture of ascone. The asphalt was AP-3.

Each amount of an asphalt (AP-3), a co-aggregate and a modifier was also shown in the following table 5.

The wheel tracking test was performed using large-scale actual size paving test equipment designed by Transportation Road Research Laboratory (TRRL) of U.K. During the test, 7.0 kg/cm$^2$ of contact pressure were given to the surface of specimen, thus measuring the hollowed-out depth by wheel tracks per unit time. The test was also performed based on KS M 2250, one of the test methods which can indirectly evaluate the plastic deformation of asphalt.

The method for calculating the deformation amount was that when the graduation of dial gauge initially passed the central line, it was predetermined as a starting point and at that time, the deformation amount was measured in the center of the driving range of test wheels.

The results of the wheel tracking tests were represented by the rate of deformation (mm/min) after a 15-minute driving from 45 minutes to 60 minutes, when the correlation curve between deformation level (sinking level) and time was nearly constant.

The test specimen was prepared in such a manner that 5.79 wt. parts of asphalt heated at 150° C. were added to 100 wt. parts of co-aggregate heated up to 200° C. for homogeous mixing, followed by the addition of 0.21 wt. parts of modifer and homogeous mixing thereto.

The mixture (ascone) was infused into a 300 mm square mould with 50 mm in thickness and compacted with a roller compactor. The compaction load was 900 kg.

TABLE 5

| Asphalt quality | Specific gravity (25° C.) | 1.032 |
|---|---|---|
| | Softening point (° C.) | 44.0 |
| | Infiltration point (25° C., 100 g, 5 secs, 1/10 mm) | 95 |
| | Flash point | 338 |
| | Elongation (25° C., 5 cm/min, cm) | More than 100 |
| | Viscosity (60° C., POISE) | 540 |
| | Infiltration ratio after heating of thin membrane (%) | 68.4 |
| | Infiltration ratio after heating of thin membrane (25° C., 5 cm/min, cm) | More than 75 |
| | Extra soluble amount of trichloroethane (%) | 99.72 |
| Ratio of aggregate size | 19 ~ 13 mm | 30 |
| | 13 ~ 5 mm | 24 |
| | 5 ~ 0 mm | 36 |
| | Sand | 6 |
| | Lime powder | 4 |
| Amounts of asphalt, co-aggregate and modifier (wt. part) | Co-aggregate | 100 |
| | Asphalt (AP-3) | 5.79 |
| | Modifier | 0.21 |

TABLE 6

| Category | Deformation amount (mm/min) |
|---|---|
| Example 1 | 0.0946 |
| Example 2 | 0.0553 |
| Example 3 | 0.0173 |
| Comparative example 1 | 0.0095 |

Meantime, to judge the crack of asphalt at low temperature, the elongation was measured at low temperature.

When the elongation value is larger at low temperature, the brittleness of asphalt becomes reduced at low temperature and thus, the elevated combination power with aggregate at low temperature may prevent the occurrence of crack at low temperature.

The elongation test was performed based on ASTM D 113 (KS M 2254) in such a manner to measure the extended length before the asphalt specimen breaks as centimeter unit under the following conditions: specimen section (1 cm$^2$), measurement temperature (25° C., 15° C., 7° C. and 0° C.), and a constant-temperature water tank. The specimen was strongly pulled until both sides breaks at a speed of 5 cm per minute.

The asphalt used for the manufacture of specimen was prepared via homogeneous melting of both 96.5 wt. parts of AP-3 asphalt (table 5) and 3.0 wt. parts of modifier (table 4).

When the modifier was employed in the above procedure, the elongation value of asphalt at low temperature was shown in the following table 7.

TABLE 7

| | Elongation (25° C., cm) | Elongation (15° C., cm) | Elongation (7° C., cm) | Elongation (0° C., cm) |
|---|---|---|---|---|
| Example 1 | 150 | 135 | 105 | 92 |
| Example 2 | 150 | 122 | 93 | 73 |
| Example 3 | 139 | 103 | 78 | 52 |
| Comparative example 4 | 111 | 69 | 35 | 20 |

From the above tables 6~7, when the asphalt modifier of this invention was employed for the manufacture of ascone, it was noted that the plastic deformation of asphalt was significantly improved, while the occurrence of crack at low temperature was reduced.

As described above, the asphalt modifier of this invention using a mixture of emulsified styrene-butadiene-styrene block copolymer and styrene-butadiene latex has an excellent resistance property against plastic deformation, while preventing the occurrence of crack at low temperature, thus preparing high qualities of modified asphalt which can be used at very high and low temperatures.

What is claimed is:

1. Asphalt modifier comprising a mixture of 5–30 wt % of emulsified styrene-butadiene-styrene block copolymer and 70–95 wt. % of styrene-butadiene latex.

\* \* \* \* \*